US009040072B2

(12) United States Patent
Zhou et al.

(10) Patent No.: US 9,040,072 B2
(45) Date of Patent: May 26, 2015

(54) USE OF COUPLING AGENTS TO IMPROVE THE INTERFACE IN ABSORBABLE POLYMER COMPOSITES

(75) Inventors: Yue Zhou, Horseheads, NY (US); Kevin Cooper, Flemington, NJ (US); Yufu Li, Bridgewater, NJ (US); Zhigang Li, Hillsborough, NJ (US)

(73) Assignee: ETHICON, INC., Somerville, NJ (US)

( * ) Notice: Subject to any disclaimer, the term of this patent is extended or adjusted under 35 U.S.C. 154(b) by 1030 days.

(21) Appl. No.: 11/952,218

(22) Filed: Dec. 7, 2007

(65) Prior Publication Data
US 2009/0149873 A1    Jun. 11, 2009

(51) Int. Cl.
| | | |
|---|---|---|
| *A61F 2/00* | (2006.01) | |
| *A01N 43/00* | (2006.01) | |
| *A61K 31/33* | (2006.01) | |
| *C08K 9/08* | (2006.01) | |
| *C08L 67/02* | (2006.01) | |
| *C08L 67/04* | (2006.01) | |
| *C08L 69/00* | (2006.01) | |
| *C08L 23/08* | (2006.01) | |

(52) U.S. Cl.
CPC . *C08K 9/08* (2013.01); *C08L 67/02* (2013.01); *C08L 67/04* (2013.01); *C08L 69/00* (2013.01); *C08L 23/08* (2013.01)

(58) Field of Classification Search
None
See application file for complete search history.

(56) References Cited

U.S. PATENT DOCUMENTS

| 4,650,818 A | 3/1987 | Oka |
| 2008/0287984 A1* | 11/2008 | Weber et al. ................ 606/194 |

FOREIGN PATENT DOCUMENTS

| CN | 1328586 A | 12/2001 |
| CN | 101003667 A | 7/2007 |
| JP | 49034937 | 3/1974 |
| JP | 61009447 | 1/1986 |
| JP | 11-332975 | 12/1999 |
| JP | 2001-234059 | 8/2001 |
| JP | 2003-102755 | 4/2003 |
| TW | 200736325 | 2/1996 |
| WO | WO 00/17270 | 3/2000 |
| WO | WO 2004/099316 | 11/2004 |
| WO | WO 2007/095708 | 8/2007 |
| WO | WO 2008/049242 | * 5/2008 ............ A61L 27/48 |

OTHER PUBLICATIONS

Pramanik et al. in Journal of the American Ceramic Society, 90, 369-375 (2007).*
Petricca et al. in Acta Biomaterialia 2 (2006) 277-286.*
Pramanik et al. in Polymer Composites 27(6) 633-641 (2006) (Published Online: Oct. 27, 2006).*
Pramanik2006Abstract.*
Ogose et al. in Journal of Biomedical Research B Applied Biomaterials 2005; 72(1):94-101.*
Chemist's Companion, Gordon and Ford, Wiley & Sons, New York (1972).*
M.C. Azebedo et al., "Development and properties of polycaprolactone/hydroxyapatite composite biomaterials", Journal of Materials Science: Materials in Medicine, 14 (2003) pp. 103-107.
Xueyu Qiu et al., "Hydorxyapatite Surface Modified by L-Lactic Acid and its Subsequent Grafting Polymerization of L-Lactide", 43$^{rd}$ Microsymposium of Polymer Biomaterials: Biomimetic and Bioanalogous Systems, held in Prague, Czech Republic, Jul. 11-15, 2004 A-G.
Jeffrey Jordan et al., "Experimental trends in polymer nanocomposites—a review", Materials Science & Engineering A 393 (2005) pp. 1-11.
Toshihiro Kasuga et al., "Preparation and mechanical properties of polylactic acid composites containing hydroxyapatite fibers", Biomaterials 22 (2001) pp. 19-23.
Min Zhi Rong et al., "Structure-property relationships of irradiation grafted nano-inorganic particle filled polypropylene composites", Polymer 42 (2001) pp. 167-183.
Arvanitoyannis I., et al 'Biodegreadable Films Made From Low Density Polyethylene (LDPE), Ethylene Acrylic Acid (EAA), Polycaprolactone (PCL) and Wheat Starch For Food Packaging Applications: Part 3' Stake- Starch, Wiley-VCH Verlag, Weinheim, DE, vol. 40, No. 7/08, Jul. 1, 1997, pp. 306-322, XP000697700.
Database WPI Week 197450, Thomson Scientific, London, GB; AN 1974-86113V, XP002514778 & JP49034937 A (Mitsubishi Petrochemical Co Ltd), Feb. 17, 2009.
Database WPI Week 198609, Thomson Scientific, London, GB; AN 1986-058389, XP002514777 & JP61009447 A (Nippon Petrochemicals Co), Feb. 17, 2009.
Database WPI Week 199144, Thomson Scientific, London, GB; AN 1991-322627, XP002514779 & KR900006335 B (Sun Kyung Chem Co), Feb. 17, 2009.
Vicki Rosen and R. Scott Thies, The Cellular and Molecular Basis of Bone Formation and Repair, Molecular Biology Intelligence Unit, published by R.G. Landes Company 1994, pp. 1-26.

* cited by examiner

*Primary Examiner* — Anna Pagonakis
*Assistant Examiner* — Daniel M Podgorski

(57) ABSTRACT

A composite having a poly(ethylene-co-acrylic acid) coupling agent, a filler, and a biocompatible, biodegradable polymer matrix is disclosed. The composites are useful for biomedical applications such as, tissue engineering, drug delivery, and implantable medical devices.

12 Claims, No Drawings

USE OF COUPLING AGENTS TO IMPROVE THE INTERFACE IN ABSORBABLE POLYMER COMPOSITES

FIELD OF THE INVENTION

The field of art to which this invention relates is composite materials that utilize coupling agents to improve the interfacial bonding between the filler and the polymer matrix; the composites may be useful for biomedical applications including tissue engineering, drug delivery, and implantable devices.

BACKGROUND OF THE INVENTION

Metals have been extensively in medical devices due to their high stiffness and strength. Metal implants, being much stiffer than tissue, may become the primary load-bearing member thereby protecting the tissue from stress, which may result in undesirable stress shielding.

The use of absorbable polymers, materials that degrade in the body and then are either absorbed into or excreted from the body, has the potential to help alleviate the negative effects of stress shielding. Additionally, absorbable polymers are widely used due to their biocompatibility, and sustained release. Biodegradable polymeric materials have been used as medical devices in the form of pins, rods, anchors, screws, staples, and fasteners for a variety of medical applications. However, the relatively low stiffness and strength of biodegradable devices compared with metallic implants in most cases has typically limited their use to low-load bearing applications or non-load bearing applications.

Inorganic fillers (inclusions of ceramics or metal fibers, whiskers, platelets, or particles) have been used as reinforcement materials to enhance the mechanical properties of biodegradable polymeric materials. The embedding of such inclusions in a host matrix to make composites, which gives material properties not achieved by either phase alone, has been a common practice for many years. Using this approach, strength and stiffness of the absorbable polymers can be improved. For example, it is known that polylactides reinforced with tricalcium phosphates exhibit increased stiffness, but are brittle since no coupling or bonding has been developed between the inclusions and the polymer matrix. Hence, the polymer's ductile nature is lost. Due to such inherent brittleness, inorganic filler-reinforced biodegradable polymers have often been limited to non- or low-load bearing applications.

Processing techniques have been developed to allow nano-sized (1-1000 nm) inclusions to be introduced into non-absorbable polymers with some success. Non-absorbable polymer nanocomposites have been shown to have improved properties over polymers with micron-sized inclusions.

Various coupling agents have been utilized to improve the affinity of absorbable polymers to fillers. These coupling agents include silane coupling agents, zirconyl salts, and organic isocyanates. However, the grafted organic molecules mentioned above are typically noxious. Therefore, it would be highly desirable to form absorbable polymer composites with nano-sized (1-100 nm) inclusions where to the polymer properties are maintained, especially the polymer's ductile properties of toughness and elongation-to-break.

SUMMARY OF THE INVENTION

Accordingly, novel composites are disclosed. The composites of the present invention have a poly(ethylene-co-acrylic acid) coupling agent, a filler, and a polymer matrix. The poly(ethylene-co-acrylic acid) coupling agent enhances or improves the interfacial bonding between the filler and the polymer matrix, thereby maintaining or enhancing the polymer matrix's ductile properties of toughness and elongation to break. The composites described herein are useful for biomedical applications such as, tissue engineering, drug delivery, and implantable devices.

DETAILED DESCRIPTION OF THE INVENTION

The present invention provides composites consisting of a poly(ethylene-co-acrylic acid) (PEAA) coupling agent, a filler, and a biocompatible, biodegradable polymer matrix. The PEAA is believed to improve the interfacial bonding between the filler and the polymer matrix. The composites are useful for biomedical applications such as, tissue engineering, drug delivery, and implantable devices.

The poly(ethylene-co-acrylic acid) coupling agent contains multiple carboxyl groups and between the carboxyl groups are hydrophobic segments. The copolymer can be random or blocky. In one embodiment, the poly(ethylene-co-acrylic acid) is a 20:80 mole:mole poly(ethylene-co-acrylic acid) (PEAA).

Suitable fillers useful in the composites of the present invention include, but are not limited to biocompatible glasses or ceramics, such as mono-, di-, tri-, alpha-tri-, beta-tri-, and tetra-calcium phosphate, hydroxyapatite, fluoroapatites, barium sulfates, calcium fluorides, calcium sulfates, calcium oxides, calcium carbonates, magnesium calcium phosphates, phosphate glasses, and bioglasses. In one embodiment, the filler includes but is not limited to mono-, di-, tri-, alpha-tri-, beta-tri-, and tetra-calcium phosphate. In another embodiment, the filler is beta-tricalcium phosphate. The fillers may be of any shape (spherical, fiber, wisker, platelets). In one embodiment, the fillers are spherical or are fibers with an aspect ratio. The filler size will be sufficient to effectively provide improved physical properties to the composite. The preferred filler size may be about 1 nanometer to about 1000 nanometers. The filler size is more typically about 1 nanometer to about 500 nanometers, and typically about 1 nanometer to about 250 nanometers.

The polymer matrix of the composites of the present invention is made from biocompatible, biodegradable polymers. Biodegradable polymers readily break down into small segments when exposed to moist body tissue. The segments then either are absorbed by the body, or passed by the body. More particularly, the biodegraded segments do not elicit permanent chronic foreign body reaction, because they are absorbed by the body or passed from the body, such that no permanent trace or residual of the segment is retained by the body.

Examples of suitable biocompatible, biodegradable polymers include, but are not limited to poly (alpha-hydroxy esters), such as poly (lactic acid), poly (glycolic acid), poly (epsilon-caprolactone), poly (p-dioxanone), and poly (trimethylene carbonate); poly(oxaesters); poly(oxaamides); polycarbonates; polyurethanes; polyamides; polyalkylene oxides; poly(amino acids); poly(ether-esters); polyalkylenes oxalates; poly(ethylene glycol); poly(iminocarbonates); polyamidoesters; poly (phosphoesters); polyphosphazenes; polyanhydrides; polyorthoesters; polyalkanoates, such as poly (hydroxybutyrate) (HB) and poly (hydroxyvalerate) (HV); tyrosine derived poly(amino acid), such as poly (DTH carbonates), poly (arylates), and poly (imino-carbonates); biopolymers, such as polysaccharides and proteins; and copolymers and blends thereof. Some commercially readily available biocompatible, biodegradable polymers and their commonly associated medical applications include poly (dioxanone) [PDS® suture available from Ethicon, Inc., Somerville, N.J.], poly (glycolide) [Dexon® sutures available from United States Surgical Corporation, North Haven, Conn.], poly (lactide)-PLLA [bone repair], poly (lactide/glycolide) [Vicryl® (10/90) and Panacryl® (95/5) sutures available from Ethicon, Inc., Somerville, N.J.], poly (glycolide/caprolactone (75/25) [Monocryl® sutures available from Ethicon, Inc., Somerville, N.J.], and poly (glycolide/trimethylene carbonate) [Maxon® sutures available from United States Surgical Corporation, North Haven, Conn.].

In one embodiment, the biocompatible, biodegradable polymers are poly (alpha-hydroxy esters), such as poly (lactic acid), poly (glycolic acid), poly (epsilon-caprolactone), poly (p-dioxanone), poly (trimethylene carbonate) and copolymers and blends thereof. In another embodiment, the biocompatible, biodegradable polymer is a copolymer of poly (lactic acid) (PLA) and poly (glycolic acid) (PGA), also referred to herein as poly(lactic acid-co-glycolic acid) (PLGA). In one embodiment, copolymers of poly (lactic acid) and poly (glycolic acid) consist of from about 70:30 to about 99:1 mole percent poly (lactic acid): poly(glycolic acid. In another embodiment, the copolymer of poly (lactic acid) and poly (glycolic acid) consists of about 85:15 mole percent poly (lactic acid): poly(glycolic acid.

The coupling agents of the composites of the present invention are coated onto the fillers using a variety of conventional coating processes, including mixing. The coupling agent may be physically or chemically bound to the filler, or combinations thereof. In one embodiment, a coupling agent is coated onto a filler by mixing the coupling agent in an appropriate solvent and then adding the filler to the solution forming a slurry. Suitable solvents are organic solvents including, but not limited to tetrahydrofuran (THF), dimethylformamide (DMF), dimethylacetamide (DMAC), N-methylpyrrolidone (NMP), and dimethylsulfoxide (DMSO). The particles are then isolated from the solution and dried under vacuum. For example, poly(ethylene-co-acrylic acid) (PEAA) may be mixed into THF at a concentration of less than or equal to 1% (w/vol) to form a solution. Then, a filler such as beta-TCP particles may be added to the PEAA/THF solution. After stirring sufficiently at room temperature (for example about 8 hours) the coated filler particles can be filtered out and washed sufficiently with fresh THF to remove any coupling agent that had not been adsorbed onto the filler particle surface. The coated filler particles may then be sufficiently dried under vacuum to remove the solvent. A coupling agent coated in such a manner would typically have a <10 nm thick layer on the surface of the beta-TCP filler particles, and the weight of the coupling agent coating on the filler was less than about 1% by weight of the filler particles. Those skilled in the art will realize that the thickness, wt. %, etc. of the coating will depend upon a number of parameters including but not limited to the particle type and composition, particle size, solvent, type of coupling agent, coating process, etc.

A composite of the present invention having a filler/coupling agent and a polymer matrix may be prepared in the following manner. The composite may be processed by conventional methods of compounding, for example extrusion or batch compounding, followed by chopping of the compounded material to form pellets and the like. The pellets then may be used to prepare medical devices for example, by extrusion, injection molding or compression molding. Alternately, the polymer matrix and the filler/coupling agent may be added directly to a conventional compounding and molding apparatus, for example an extruder having a sufficiently effective mixing screw configuration so as to homogenously blend the components in the extrusion barrel, with the extruder being fitted with the appropriate die to effectively form medical devices according to the present invention. Once having the benefit of this disclosure, one skilled in the art would be able to select the proper parameters and specific apparatus required for the particular composite and medical device being fabricated. For example, the medical devices can be prepared by other conventional melt processes. Typical melt processes include injection molding, extrusion, fiber spinning, compression molding, blow molding, pultrusion, etc.

In one embodiment, composites can be melted compounded and then injection molded, for example, into coupons for mechanical property tests or medical devices. For example, an 85:15 mole: mole PLGA and beta-TCP filler coated with PEAA may be fed separately into a conventional twin-screw extruder with medium shear screw design (to produce sufficiently effective dispersion). Separate gravimetric feeders are typically used for the polymer and the beta-TCP filler coated with PEAA. The process temperatures are sufficiently effective to compound the polymer with the filler, for example, 140, 180, 180, 185, 185, 185, 180° C. from the rear of the extruder to the die. A sufficiently effective rpm is set for the compounding process (e.g., 200 rpm) and the total feed rate will be sufficient to effectively uniformly distribute the filler in the composite, for example, 4 lbs/hr (depending of course on the equipment used and other parameters).

In one embodiment, the composites of the present invention typically have about 70 to about 99 wt % of polymer matrix with the remaining portion comprised of the filler and the coupling agent. In another embodiment, the composites of the present invention more typically have about 90 to about 99 wt % of polymer matrix with the remaining portion comprised of the filler and the coupling agent. In yet another embodiment, the composites of the present invention preferably have about 95 wt % of polymer matrix with the remaining portion comprised of the filler and the coupling agent.

The composite of the present invention can be used as prepared or can be further processed by annealing, orienting or relaxing under different conditions. The effect of polymer orientation in a device is believed to improve the device performance. Orientation is believed to vary the degradation time of the device, and if desired, different sections of the device can be oriented differently to provide different degradation times. Orientation can be along the axial and circumferential or radial directions as well as any other direction to enhance the performance of the device in those respective directions. The orientation may be confined to only one direction (uniaxial), may be in two directions (biaxial) and/or multiple directions (multiaxial). The orientation may be introduced in a given material in different sequences, such as first applying axial orientation followed by radial orientation and vice versa. Alternately, the material may be oriented in both directions at the same time. Axial orientation may be applied by stretching along an axial or longitudinal direction in a given material such as tubes or films at temperatures usually above the glass transition temperature of the polymer. Radial or circumferential orientation may be applied by several different conventional methods and equivalents thereof such as blowing the material by heated gas for example, nitrogen, or by using a balloon inside a mold. Alternately, a composite or sandwich structure may be formed by stacking layers of oriented material in different directions to provide anisotropic properties. Blow molding may also be used to induce biaxial and/or multiaxial orientation.

It is desirable in certain applications to have a material with improved elongation at break, i.e. ultimate strain capacity, without compromise to the modulus or ultimate strength of the material necessary to afford the device sufficiently strength. Methods to increase elongation at break while maintaining or even improving material strength and stiffness, allow the device dimensions to be kept small, thereby resulting in, if needed, better device flexibility. Traditional implantable absorbable polymers such as PLA, PGA, and copolymers of the PLA and PGA (PLGA) typically have relatively low elongation at break, e.g., approximately five to ten percent, with typically lower tensile strength and modulus compared to metals. Many metals possess an elongation at break that yields ductility (sometimes as much as forty percent), thus allowing devices such as stents made from such materials to deploy under balloon pressure without breaking.

The composites of the present invention may be oriented using various conventional processes, including the process described below. The composite may be typically heated to a temperature between the glass transition temperature (Tg) and the melting temperature (Tm) of the composite, most preferably to a temperature approximately 10 to 20° C. above the Tg of the composite. For a PLGA composite this may be a temperature of about 70° C. Heating may be achieved through various conventional processes in the art, including heated water bath, environmental chamber, induction heating, and IR radiation. Those skilled in the relevant art may recognize other methods of heating. The composite is held at this temperature for a sufficiently effective period of time, dependent on a number of factors, including the composition of the polymer matrix of the composite, the amount of crystallinity, and geometry. For example, when heating a PLGA composite tube approximately 1.5-2 mm in OD with a half millimeter wall thickness, the hold time may be about ten seconds in a 70° C. water bath.

After such time, force (drawing) is applied in the desired direction or directions to induce orientation in that direction. Drawing may be done in one direction or in multiple directions either simultaneously or sequentially. The total amount of drawing may be achieved directly from an undrawn condition at a specific drawing rate or sequentially in stages up to some final specified amount and with varying drawing rates. The orientation may be also be performed by first overdrawing the material in one or more directions and controlling the relaxation of this material to some orientation level below the overdrawn condition while maintaining the piece at the same temperature. In addition, drawing may be done in a helical direction by drawing axially and rotating the part at the same time. This may be advantageous for devices such as a helical stent design to introduce orientation along the helical pitch axis.

In one embodiment, radiopaque materials may be optionally added to the composite. The radiopaque materials may be added directly to the polymer matrix of the composite during processing resulting in fairly uniform incorporation of the radiopaque materials throughout the composite. Alternatively, the radiopaque materials may be added to the medical device prepared from the composite in the form of a layer, a coating, a band or powder at designated portions of the device depending on the geometry of the device and the process used to form the device. Coatings can be applied to the device in a variety of processes known in the art such as, for example, chemical vapor deposition (CVD), physical vapor deposition (PVD), electroplating, high-vacuum deposition process, microfusion, spray coating, dip coating, electrostatic coating, or other surface coating or modification techniques. In certain applications, it is desirable that the radiopaque material does not add significant stiffness to the device so that the device can readily traverse the anatomy within which it is deployed.

The radiopaque material should be biocompatible with the tissue within which the device is deployed. Such biocompatibility minimizes the likelihood of undesirable tissue reactions with the device. Inert noble metals such as gold, platinum, iridium, palladium, and rhodium are well-recognized biocompatible radiopaque materials. Other radiopaque materials include barium sulfate ($BaSO_4$), bismuth subcarbonate [$(BiO)_2CO_3$] and bismuth oxide. Ideally, the radiopaque materials adhere well to the device such that peeling or delamination of the radiopaque material from the device is minimized, or ideally does not occur. If the radiopaque materials are optionally mounted to the device in the form of metal bands, the metal bands may be crimped at designated sections of the device. Alternatively, designated sections of the device may be coated with a radiopaque metal powder, whereas other portions of the device are free from the metal powder.

In another embodiment, therapeutic agents may optionally be added to the composites of the present invention to form pharmaceutical compositions. Such composites having therapeutic agents therein can be used for the controlled release of therapeutically effective amounts of the therapeutic agents. The therapeutic agent can be added directly into the polymer matrix during processing of the composite. One or more therapeutic agents may be added to the composite in this manner.

The therapeutic agent may be present as a liquid, a finely divided solid, or any other appropriate physical form. Typically, but optionally, the polymer matrix will include one or more additives, such as diluents, carriers, excipients, stabilizers or the like. The amount of therapeutic agent will depend, among other things, upon the particular drug being employed and medical condition being treated including the therapeutically effective dose rate desired. Typically, the amount of therapeutic agent will be about 0.001 weight percent to about 70 weight percent, more typically about 0.00 weight 1 percent to about 50 weight percent, and preferably about 0.001 weight percent to about 20 weight percent of the matrix. The quantity and type of polymer incorporated into the drug delivery matrix will vary depending, among other things, upon the release profile desired and the amount of drug employed.

Upon contact with body fluids, the biocompatible, biodegradable composites of the present invention undergo gradual degradation (mainly through hydrolysis) with concomitant release of the dispersed drug for a sufficiently effective sustained or extended period. This typically will result in prolonged delivery (for example 1 to 5,000 hours, preferably 2 to 800 hours) of therapeutically effective amounts (e.g., 0.0001 mg/kg/hour to 10 mg/kg/hour) of the drug. This dosage form can be administered as is necessary depending on the subject being treated, the severity of the affliction, the judgment of the prescribing physician, and the like. Following this or similar procedures, those skilled in the art will be able to prepare a variety of formulations.

A variety of different therapeutic agents t can be used in conjunction with the composite including, but not limited to, bioactive agents and growth factors. In general, bioactive agents which may be administered via pharmaceutical combinations with the composites of the present invention include, without limitation: anti-infective, such as antibiotics and antiviral agents; analgesics and analgesic combinations; anorexics; antihelmintics; antiarthritics; antiasthmatic agents; anticonvulsants; antidepressants; antidiuretic agents; antidiarrheals; antihistamines; antiinflammatory agents; antimigraine preparations; antinauseants; antineoplastics; antiparkinsonism drugs; antipruritics; antipsychotics; antipyretics; antispasmodics; anticholinergics; sympathomimetics; xanthine derivatives; cardiovascular preparations including calcium channel blockers and beta-blockers such as pindolol and antiarrhythmics; antihypertensives; diuretics; vasodilators, including general coronary, peripheral and cerebral; central nervous system stimulants; cough and cold preparations, including decongestants; hormones, such as estradiol and other steroids, including corticosteroids; hypnotics; immunosuppressives such as rapamycin; muscle relaxants; parasympatholytics; psychostimulants; sedatives; tranquilizers; naturally derived or genetically engineered proteins, growth factors, polysaccharides, glycoproteins or lipoproteins; oligonucleotides; antibodies; antigens; cholinergics; chemotherapeutics; hemostatics; clot dissolving agents; radioactive agents; cystostatics; anti-proliferative/antimitotic agents including natural products such as vinca alkaloids (i.e. vinblastine, vincristine, and vinorelbine), paclitaxel, epidipodophyllotoxins (i.e. etoposide, teniposide), antibiotics (dactinomycin (actinomycin D) daunorubicin, doxorubicin and idarubicin), anthracyclines, mitoxantrone, bleomycins, plicamycin (mithramycin) and mitomycin, enzymes (L-asparaginase which systemically metabolizes L-asparagine and deprives cells which do not have the capacity to synthesize their own asparagines); antiplatelet agents such as G(GP) ll$_b$/lll$_a$ inhibitors and vitronectin receptor antagonists; anti-proliferative/antimitotic alkylating agents such as nitrogen mustards (mechlorethamine, cyclophosphamide and analogs, melphalan, chlorambucil), ethylenimines and methylmelamines (hexamethylmelamine and thiotepa), alkyl sulfonates-busulfan, nirtosoureas (carmustine (BCNU) and analogs, streptozocin), trazenes—dacarbazinine (DTIC); anti-proliferative/antimitotic antimetabolites such as folic acid analogs (methotrexate), pyrimidine analogs (fluorouracil, floxuridine and cytarabine) purine analogs and related inhibitors (mercaptopurine, thioguanine, pentostatin and 2-chlorodeoxyadenosine {cladribine}); platinum coordination complexes (cisplatin, carboplatin), procarbazine, hydroxyurea, mitotane, aminoglutethimide; hormones (i.e. estrogen); anticoagulants (heparin, synthetic heparin salts and other inhibitors of thrombin); fibrinolytic agents (such as tissue plasminogen activator, streptokinase and urokinase), aspirin, dipyridamole, ticlopidine, clopidogrel, abciximab; antimigratory; antisecretory (breveldin); anti-inflammatory; such as adrenocortical steroids (cortisol, cortisone, fludrocortisone, prednisone, prednisolone, 6α-methylprednisolone, triamcinolone, betamethasone, and dexamethasone), non-steroidal agents (salicylic acid derivatives i.e. aspirin; para-aminophenol derivatives i.e. acetaminophen; indole and indene acetic acids (indomethacin, sulindac, and etodalec), heteroaryl acetic acids (tolmetin, diclofenac, and ketorolac), arylpropionic acids (ibuprofen and derivatives), anthranilic acids (mefenamic acid, and meclofenamic acid), enolic acids (piroxicam, tenoxicam, phenylbutazone, and oxyphenthatrazone), nabumetone, gold compounds (auranofin, aurothioglucose, gold sodium thiomalate); immunosuppressives: (cyclosporine, tacrolimus (FK-506), everolimus, sirolimus (rapamycin), azathioprine, mycophenolate mofetil); angiogenic agents: vascular endothelial growth factor (VEGF), fibroblast growth factor (FGF); angiotensin receptor blockers; nitric oxide donors, antisense oligionucleotides and combinations thereof, cell cycle inhibitors, mTOR inhibitors, and growth factor receptor signal transduction kinase inhibitors; retenoids; cyclin/CDK inhibitors; HMG co-enzyme reductase inhibitors (statins); and protease inhibitors.

Growth factors include bone morphogenic proteins (i.e. BMPs 1-7), bone morphogenic-like proteins (i.e. GFD-5, GFD-7 and GFD-8), epidermal growth factor (EGF), fibroblast growth factor (i.e. FGF 1-9), platelet derived growth factor (PDGF), insulin like growth factor (IGF-I and IGF-II), transforming growth factors (i.e. TGF-βI-III), vascular endothelial growth factor (VEGF); and other naturally derived or genetically engineered proteins, polysaccharides, glycoproteins, or lipoproteins. These growth factors are described in *The Cellular and Molecular Basis of Bone Formation and Repair* by Vicki Rosen and R. Scott Thies, published by R. G. Landes Company (1994), hereby incorporated herein by reference.

The composites of the present invention, as previously mentioned, are useful in preparing medical devices. The composites of the present invention may be used to prepare conventional medical devices including, but not limited to bone fixation plates, bone screws, surgical clips, staples and other fastening devices, stents, sutures, meshes, sponges, films, catheters, devices with living hinges, cages anchors, and expanding sleeve or collar devices, all used to repair and/or augment soft tissues or to affix autografts, allografts, xenografts, or bone fragments to the bone structure of a patient.

The following examples are illustrative of the principles and practice of this invention, although not limited thereto. Numerous additional embodiments within the scope and spirit of the invention will become apparent to those skilled in the art once having the benefit of this disclosure.

EXAMPLES

Example 1

Preparation of beta-TCP Particles Coated with 20:80 Mole:Mole poly(ethylene-co-acrylic acid) (PEAA) (beta-TCP/PEAA)

A 20:80 mole:mole poly(ethylene-co-acrylic acid) (PEAA) (Sigma Aldrich, St. Louis, Mo. was physically adsorbed onto the surface of beta-TCP particles. 10 grams of PEAA was mixed into 1000 mL of THF (Sigma Aldrich, St. Louis, Mo.) with magnetic stirring bar in a 2 L beaker on a magnetic stirring plate. 200 grams of beta-TCP particles having an average size of about 100 nanometers (Berkley Advanced Biomaterials, Berkley, Calif.) were added. After stirring at room temperature for greater than 8 hours, the particles were filtered out and washed three times with fresh THF to remove any coupling agent that had not adsorbed onto the particle surface. The treated particles were then dried under vacuum in a vacuum oven at room temperature to remove the solvent.

The particles were characterized using an X-ray Photoelectron Spectrometer (XPS) (Evans Analytical Group, East Windsor, N.J.). XPS analysis showed that the coupling agent formed a <10 nm thick layer on the surface of the beta-TCP particles. The total amount of the coupling agent on the treated particles was less than 1% by weight. The beta-TCP/PEAA particles were also characterized by contact angle using a contact angle goniometer. A pellet was prepared from the particles using a Macro-Micro die kit (Thermo-Fisher Scientific, Waltham, Mass.). The particles were placed in the die and vacuum was applied. The die was placed in a Carver press (Carver, Inc., Wabash, Ind.) and compressed up to approximately 8,000 lbs. The water contact angle was measured on a static drop placed on the pellet. The contact angle (theta$_a$) of the particle surfaces changed from less than 10° for the beta-TCP pellet to 95-120° for the beta-TCP/PEAA pellet. This change in contact angle confirms that the hydrophilic beta-TCP particle surface became more hydrophobic providing further evidence that the PEAA was adsorbed onto the surface of the particles.

Example 2

Preparation of beta-TCP and beta-TCP/PEAA Composites with 85:15 Mole:Mole poly(lactide-co-glycolide) (PLGA)

PLGA/beta-TCP composites were compounded and then molded into coupons for mechanical property tests. For example, 85:15 mole:mole PLGA (lot #0412000119, Purac America, Lincolnshire, Ill.) and nanosized beta-TCP coated with PEAA (from Example 1) were fed separately into a 18-mm Leistritz twin-screw extruder (Model Micro 18 GL/35, American Leistritz, Somerville, N.J.) with medium shear screw design (to produce good dispersion). An ARBO gravimetric Feeder (Model KDA-VV/10 Micro, Arbo Engineering Inc, Toronto, Ontario, Canada) was used for the polymer and a K-Tron gravimetric feeder (Model KCLKT20, K-Tron International, Inc. Pitman, N.J.) was used for the beta-TCP/PEAA. The process temperatures were 140, 180, 180, 185, 185, 185, and 180° C. from the rear of the extruder to the die. 200 rpm was set for the compounding process. The total feed rate was 4 lbs/hr. Composites of beta-TCP with 85:15 PLGA and composites of beta-TCP/PEAA with 85:15 PLGA were prepared as described above in 70:30, 85:15, and 95:5 weight-to-weight ratios of 85:15 PLGA to beta-TCP or beta-TCP/PEAA. See Table 1.

TABLE 1

Inherent Viscosity Results (dL/g)

| Sample ID | Avg. IV |
| --- | --- |
| 85:15 PLGA alone | 3.14 |
| 70:30 PLGA/beta-TCP | 1.19 |
| 70:30 PLGA/(beta-TCP/PEAA) | 1.57 |
| 85:15 PLGA/beta-TCP | 1.24 |
| 85:15 PLGA/(beta-TCP/PEAA) | 2.08 |
| 95:5 PLGA/beta-TCP | 1.70 |
| 95:5 PLGA/(beta-TCP/PEAA | 2.63 |

Compared to the beta-TCP alone, the melting viscosity of the composite using beta-TCP/PEAA is higher. Additionally, the inherent viscosities (Table 1) of the composites containing the beta-TCP/PEAA are preserved more than those with beta-TCP alone. This data indicates better dispersion of the particles and less shear of the polymer, likely due to less surface roughness on the particle surfaces.

Injection molding of test bars (ASTM D638 Type V) was conducted on a 35-ton NIIGATA injection molder (Model: NN35MI super MIRS 4000; Niigata, Daiichi Jitsugyo, Inc. Itasca, Ill.). 70:30 and 85:15 weight-to-weight PLGA/beta-TCP composites were too brittle to mold. As with the extrusion process, beta-TCP/PEAA composites gave better processability in the injection molding process since the shear of the polymer was less due to the better particle dispersion and less particle surface roughness.

Mechanical properties of the composites were measured using an Instron 4201 (Instron, Norwood, Mass.). A tensile testing procedure was performed with a cross-head rate of 5 millimeter/min, see Table 2. Toughness of the beta-TCP/PEAA composites with increased significantly in comparison to the composites with beta-TCP alone, especially for the 5 wt % beta-TCP/PEAA, with little loss of strength and an improvement in modulus compared to the polymer.

TABLE 2

Mechanical Properties

| Samples | Young Modulus (GPa) | Strength at Peak (MPa) | Maximum Percent Strain |
| --- | --- | --- | --- |
| 70:30 PLGA/(beta-TCP/PEAA) | 5.30 | 29.9 | 1.5 |
| 85:15 PLGA/(beta-TCP/PEAA) | 4.56 | 58.4 | 4.6 |
| 95:5 PLGA/beta-TCP | 3.78 | 62.7 | 2.7 |
| 95:5 PLGA/(beta-TCP/PEAA) | 3.99 | 71.3 | 50 |

In the beta-TCP/PEAA composites, the polyacids bind to the surface of the ceramic particles through interactions between the carboxyl groups of the coupling agent and the cations (calcium) of the ceramic particle. Through these interactions, the coupling agent self-assembles onto the ceramic surface with the acid groups in contact with the ceramic surface and the more hydrophobic groups of the polyacid facing outward due to their differences in surface tension with the ceramic surface. When incorporated into a polymeric matrix with similar hydrophobicity, the hydrophobic segments of the polyacid coupling agent interacts with the polymer matrix and become entangled to form a strong physical bond. This improves the dispersion of the particles in the polymer matrix, thereby improving the mechanical properties of the composite.

Additionally, the coupling agent acts as a lubricant and reduces the shear between the ceramic particulates and the matrix polymer during processes such as melt compounding, extrusion and injection molding. By reducing shear, the matrix polymer does not degrade to as great of an extent, especially as the surface area of the ceramic particulates increases. A lesser degree of degradation will lead to an improvement in mechanical properties. More so, it is believed that the hydrophobic segments will prevent water penetration at the interface between the ceramic and polymer. This should improve the in vitro strength retention of the composites.

Therefore, by incorporating these self-assembled layers onto ceramics and then incorporating the coated particulates into a ceramic/polymer composite, a significant improvement in mechanical properties is obtained. Medical devices that require high strength and toughness will benefit from this technology.

Example 3

Preparation of Tubes from 95:5 Weight to Weight PLGA/(beta-TCP/PEAA) Composite and PLGA Alone The 95:5 weight-to-weight PLGA/(beta-TCP/PEAA) composite compounded in Example 2 and PLGA alone were used in extrusion of tubing. For example, a the 95:5 w/w PLGA/(beta-TCP/PEAA) composite from Example 2 was fed into a 14-mm Killion single-screw extruder (MFR: Killion Inc., Cedar Grove, N.J.). The process temperatures were 330, 350, 375, 410, 425° F. from the rear of the extruder to the die. 15 rpm was set for the process. A 0.097"×0.200" die, and 0.065"×0.250" mandrel were used. The draw ratio was 2.97, and the final dimension of the tubing was 0.0575" OD and 0.0395" ID. The PLGA alone tubes were prepared for comparison as described above.

Mechanical properties of the composite tube and the PLGA tube were measured using an Instron 4201. A tensile testing procedure was performed with a cross-head rate of 5 millimeter/min, see Table 3. Toughness and elongation-to-break of the composite significantly improved in comparison to the polymer alone.

TABLE 3

Mechanical Properties

| Samples | Maximum Percent Strain |
|---|---|
| 95:5 PLGA/(beta-TCP/PEAA) | 150 |
| PLGA | 57 |

Example 4

Drawing Experiments on a 95:5 Weight to Weight PLGA/(beta-TCP/PEAA) Composite

Drawing experiments were performed on the 95:5 weight-to-weight PLGA/(beta-TCP/PEAA) composite that was prepared in Example 2. A compressed sheet with approximately 0.020" thickness was produced using a 30-T Wabash compression molder (Wabash MPI, Wabash, Ind.) under the conditions of 400 F, 30K lb and 60 seconds. The sheet was then cut into 2"×0.25" strips. The strips were drawn in the water bath at 70° C. to the designed ratios. For example, a marked strip was clapped on both ends by two pliers. The strip was immersed into the 70° C. water bath for 5 to 10 seconds and then drawn to the designed length using preset marks as the indications. The PLGA alone samples were prepared for comparison as described above.

Mechanical properties of the drawn test strips were measured using an Instron 4201, see Table 4. A tensile testing procedure was performed with a cross-head rate of 5 millimeter/min. Toughness and elongation-to-break of the 95:5 weight to weight PLGA/(beta-TCP/PEAA) composite was significantly increased in comparison to the polymer alone.

TABLE 4

Mechanical Properties

| Samples and Draw ratio | Strength at Peak (MPa) | Maximum Percent Strain |
|---|---|---|
| 95:5 PLGA/(beta-TCP/PEAA) 1x | 71 | 50 |
| 95:5 PLGA/(beta-TCP/PEAA) 1.5x | 70 | 253 |
| 95:5 PLGA/(beta-TCP/PEAA) 3.5x | 228 | 55 |
| PLGA 1x | 58 | 5 |
| PLGA 1.5x | 60 | 182 |
| PLGA 3.5x | 159 | 24 |

Example 5

Injection Molding a Bone Plate of a 95:5 Weight to Weight PLGA/(beta-TCP/PEAA) Composite The 95:5 weight to weight PLGA/(beta-TCP/PEAA) composite as prepared in Example 2 is formed into bone plates Hence, 1.5 kg of the composite is added to a nitrogen purged hopper of a 35-ton NIIGATA injection molder equipped with an 18 mm diameter barrel to form the bone plate. Two heating zones of 170° C. and 170° C. were employed to melt the composite as it entered the barrel. A nozzle temperature of 170° C. with an injection pressure of 500 psi and a speed of 2 in/s is used to feed the molten material down the barrel. Each injection produced a single part in a single cavity mold. A temperature of 30° C. was used in the mold to optimize the stress levels in the part. Using this process, 2 parts are formed per minute.

Although this invention has been shown and described with respect to detailed embodiments thereof, it will be understood by those skilled in the art that various changes in form and detail thereof may be made without departing from the spirit and scope of the claimed invention.

We claim:

1. A composite comprising:
   a beta-tricalcium phosphate filler comprising coated particles, each particle having an outer surface, and a copolymer of poly (lactic acid);
   a coating comprising a 20:80 mole: mole poly (ethylene-co-acrylic) coupling agent, said coating deposited on the outer surface of the particles; and,
   a poly (glycolic acid) polymer matrix.

2. The composite of claim 1 wherein the 20:80 moles: mole poly (ethylene-co-acrylic acid) coupling agent comprises a coating on the beta-tricalcium phosphate filler.

3. The composite of claim 1 wherein the copolymer of poly (lactic acid) and poly (glycolic acid) comprises about 70:30 to about 99:1 mole: mole poly (lactic acid): poly (glycolic acid).

4. The composite of claim 3 wherein the copolymer of poly (lactic acid) and poly (glycolic acid) comprises about 85:15 moles: mole poly (lactic acid): poly (glycolic acid).

5. The composite of claim 4 wherein the polymer matrix comprises about 70 to about 99 wt % of the total weight of the composite.

6. The composite of claim 5 wherein the polymer matrix comprises about 90 to about 99 wt % of the total weight of the composite.

7. The composite of claim 6 wherein the polymer matrix comprises about 95 wt % of the total weight of the composite.

8. A composite comprising:
   a beta-tricalcium phosphate filler comprising coated particles, each particle having an outer surface; and,
   a coating comprising a poly (ethylene-co-acrylic) coupling agent, said coating deposited on the outer surface of the particles; and,
   a copolymer of poly (lactic acid) and poly (glycolic acid) polymer matrix wherein the polymer matrix comprises about 95 wt % of the total weight of the composite.

9. The composite of claim 8 further comprising a radio opaque material.

10. The composite of claim 8 further comprising a therapeutic agent.

11. A medical device, comprising:
    a composite, said composite comprising:
    a beta-tricalcium phosphate filler comprising coated particles, each particle having an outer surface, and a polymer of poly (lactic acid);
    a coating comprising a 20:80 mole: mole poly (ethylene-co-acrylic) coupling agent, said coating deposited on the outer surface of the particles; and,
    a poly (glycolic acid) polymer matrix.

12. A method of making the composite of claim 1 comprising:
    dissolving a poly (ethylene-co-acrylic acid) coupling agent in an organic solvent;
    adding beta-tricalcium phosphate filler to the solvent to provide a slurry, said filler comprising particles, each particle having a surface:

mixing the slurry to provide a coating of the coupling agent on at least part of each surface of each particle of the filler;
isolating the poly (ethylene-co-acrylic acid) coated beta-tricalcium phosphate filler;
drying the poly (ethylene-co-acrylic acid) coated beta-tricalcium phosphate filler; and
compounding the poly (ethylene-co-acrylic acid) coated beta-tricalcium phosphate filler with a poly(glycolic acid) polymer matrix.

* * * * *